Dec. 1, 1925.  1,563,742

C. C. HANSEN

CLUTCH MECHANISM FOR DOUBLE DRUM HOISTS

Filed June 24, 1925

INVENTOR
Charles C. Hansen
BY
Herbert Ogden
HIS ATTORNEY

Patented Dec. 1, 1925.

1,563,742

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CLUTCH MECHANISM FOR DOUBLE-DRUM HOISTS.

Application filed June 24, 1925. Serial No. 39,173.

*To all whom it may concern:*

Be it known that I, CHARLES C. HANSEN, a citizen of the United States, and a resident of Easton, in the county of Northampton and State of Pennsylvania, have invented a certain Clutch Mechanism for Double-Drum Hoists, of which the following is a specification accompanied by drawings.

This invention relates to double drum hoists in which one drum or the other is adapted to be positively driven from a reversible driving shaft according to the direction in which the shaft is driven.

The objects of the invention are to improve upon the pawl or dog carried on the main driving head between the drums and secure a strong and durable pawl, either or both halves of which may be removed as desired in case of wear or breakage.

Further objects will hereinafter appear and the invention is shown in one of its preferred forms in the accompanying drawing, in which—

Figure 1:
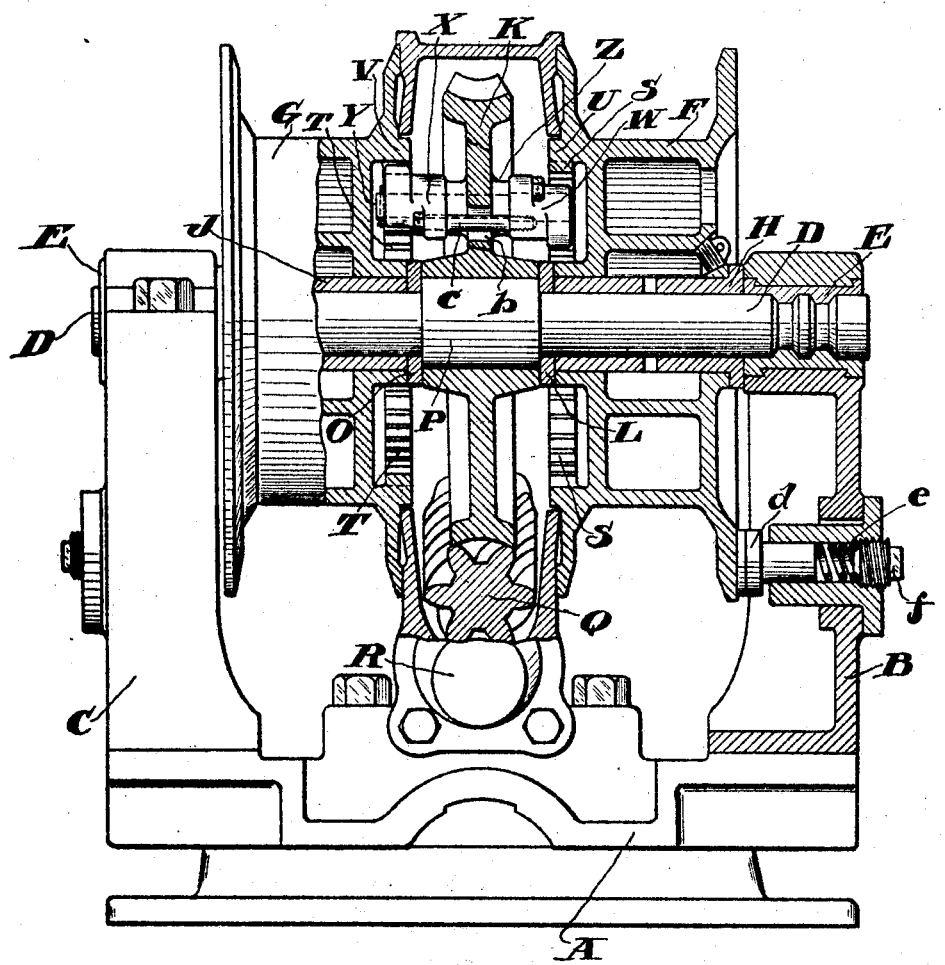
Figure 2:
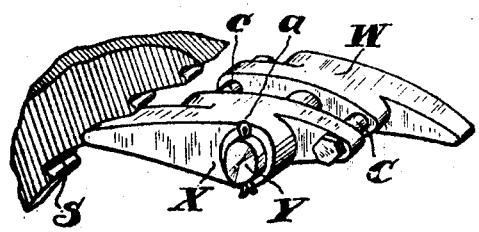

Figure 1 is a side elevation partly in longitudinal section showing a hoist, and Figure 2 is a detail perspective view of the pawls and a portion in section of one of the drum drivers.

Referring to the drawing, the main frame A is provided with the side frames or standards B and C in which the drum shaft D is either stationarily or rotatably mounted in the bearings E. The drums F and G are rotatable relatively to the shaft D and in this instance rotate upon the bearing sleeves H and J. A gear K is rotatably mounted on the shaft D between the drums and spacers L and O are preferably located between the gear K and the drums. The shaft D is preferably provided with an enlarged central portion P which aids in centering the drums and gear K.

The gear K forms a main driving head or main driver driven from the reversible driving shaft Q shown as a worm shaft journalled in the housing R on the main frame A and adapted to be driven by a reversible motor of any suitable type (not shown).

The drums F and G are provided with drum drivers S and T in the form of oppositely facing ratchet teeth which may be integral with the oppositely facing drum flanges U and V and the main driver or gear K carries the pawls or dogs W and X at each side adapted to cooperate respectively with the drum drivers S and T. A pivot pin Y is carried transversely in the boss Z on the gear K and the pawls W and X are mounted on said pivot pin and held in position by any suitable means as for instance the cotter pin *a*. The gear K is provided with apertures *b* and bolts *c* pass through these apertures *b* and secure the pawls to each other so that said pawls rock together either upon the pivot pin Y or together with the pivot pin, as desired. There is sufficient play or lost motion between the bolts *c* and the periphery of the apertures *b* in the gear to permit the pawls to rock.

In the operation of the device, one pawl or the other will be carried into engagement with the ratchet teeth of one drum driver or the other according to the direction in which the main driver K is rotated by the reversible driving shaft G as now well understood by those skilled in the art. If desired, a brake mechanism may be applied to one or both drums. In this instance, a brake in the form of a shoe *d* is pressed against the periphery of one drum by means of the spring *e*, the tension of which may be adjusted by the screw plug *f*.

I claim:

1. In a double drum hoist in which one drum or the other is adapted to be driven from a reversible driving shaft, the combination of a driving shaft and relatively rotatable drums, a main driver mounted between the drums, toothed drum drivers on the drums having oppositely facing teeth, a pivot pin transversely carried by the main driver, oppositely facing pawls removably connected to the projecting ends of said pivot pin, and bolts connecting said pawls, said bolts extending through apertures in the main driver and having play therein to permit the pawls to rock on the axis of the pivot pin.

2. In a double drum hoist in which one drum or the other is adapted to be driven from a reversible driving shaft, the combination of a driving shaft and relatively rotatable drums, a main driver mounted between the drums, toothed drum drivers on the drums having oppositely facing teeth, a pivot pin transversely carried by the main driver, oppositely facing pawls removably connected to the projecting ends of said pivot pin, bolts connecting said pawls, said bolts extending through apertures in the main driver and having play therein to permit the pawls to rock on the axis of the pivot pin, said main driver having a perpheral gear, and a worm on said driving shaft meshing with said gear for rotating the main driver in one direction or the other.

In testimony whereof I have signed this specification.

CHARLES C. HANSEN.